United States Patent [19]
Bonfilio et al.

[11] Patent Number: 4,676,545
[45] Date of Patent: * Jun. 30, 1987

[54] MODULAR CHASSIS FOR LAND, SEA AND AIR VEHICLES

[76] Inventors: Paul F. Bonfilio, 47-25 198th St., Auburndale, N.Y. 11358; Richard Stobe, 2229 Marcel Dr., Orange Park, Fla. 32073

[ * ] Notice: The portion of the term of this patent subsequent to Dec. 27, 2000 has been disclaimed.

[21] Appl. No.: 564,596

[22] Filed: Dec. 22, 1983

Related U.S. Application Data

[63] Continuation-in-part of Ser. No. 280,345, Jul. 6, 1981, Pat. No. 4,422,685.

[51] Int. Cl.⁴ .............................................. B62D 25/00
[52] U.S. Cl. ..................................... 296/197; 296/203; 114/357; 440/90; 244/120
[58] Field of Search ............... 114/58, 357; 440/90; 244/2, 120, 121; 296/1 R, 24 R, 193, 196, 197, 203, 204

[56] References Cited

U.S. PATENT DOCUMENTS

| | | | |
|---|---|---|---|
| 2,487,646 | 11/1949 | Gluhareff | 244/120 |
| 2,563,731 | 8/1951 | Masterson | 244/2 |
| 2,711,708 | 6/1955 | Thornburg | 440/91 |
| 3,612,440 | 10/1971 | Strong | 244/2 |
| 3,663,976 | 5/1972 | Momany | 114/357 |
| 3,749,594 | 7/1973 | Bibb | 114/357 |
| 3,760,763 | 9/1973 | Brusacoram | 114/270 |
| 3,898,949 | 8/1975 | Kearsey | 114/270 |
| 4,135,470 | 1/1979 | Ono | 114/270 |
| 4,260,280 | 4/1981 | Hirn et al. | 296/196 |
| 4,422,685 | 12/1983 | Bonfilio et al. | 296/197 |

FOREIGN PATENT DOCUMENTS 510426  3/1955  Canada .............................. 296/196

*Primary Examiner*—Trygve M. Blix
*Assistant Examiner*—Stephen P. Avila
*Attorney, Agent, or Firm*—Michael Ebert

[57] ABSTRACT

A modular structure formed of components which when assembled define the basic chassis of a land, sea, or air vehicle, to which chassis is attachable a body which may be a fuselage or hull in a selected configuration to create the desired vehicle. The structure consists of substantially identical front and rear cradles joined to opposing ends of a floor tray. The use to which the cradles are put depends on the nature of the vehicle, so that in the case of a land vehicle, wheel suspension fixtures are bolted to the cradles to support the wheels depending on the nature of the vehicle. Overlying the floor tray and secured thereto is a safety capsule, the capsule acting as a truss for the chassis and functioning as the cockpit section of a body which, in the case of an automobile, is completed by a front body section secured to the front cradle and a rear body section secured to the rear cradle.

13 Claims, 10 Drawing Figures

MODULAR CHASSIS FOR LAND, SEA AND AIR VEHICLES

BACKGROUND OF INVENTION

The present invention relates to a modular structure formed of components which when assembled define the basic chassis of a land, sea or air vehicle, to which may be attached various body forms to create a vehicle of a desired type.

The major elements of an automobile are the chassis on which all other elements are assembled; the running gear; the propulsion means; the body, and various accessories. In the typical motor car, the chassis or structural frame is composed of a network of beams and tubular steel members mainly located in a horizontal plane, rigidity being provided by beam action.

The running gear supported on the chassis consists of wheels, springs, axles, brakes and a steering mechanism. In addition to an internal combustion engine supported on the chassis, the propulsion means includes a transmission and a drive shaft to operatively couple the engine to the driven wheels. The body is mounted over the chassis and includes glazing, doors and interior fittings. The accessories are constituted by the radiator, the fuel tank, the defroster and other auxiliaries.

Mass production and assembly line techniques were first introduced in 1917 by the Ford Motor Company. In manufacturing the Model T, the first low-priced vehicle, the chassis, the engine and all other elements of the car were put together at a series of work stations in an assembly plant and then tested; after which the assembly was driven to a site outside the plant where the body was caused to slide down a chute onto the top of the chassis. After the body was bolted in place, the complete Model T was ready to be driven away. This now seemingly obvious procedure then represented a radical innovation in manufacturing techniques.

With the sharply rising cost of fuel and growing competition from foreign manufacturers, who have greatly advanced assembly line techniques, American automakers are being subjected to increasing pressure to construct smaller, lighter and more fuel-efficient vehicles. And while the current crop of compact vehicles being manufactured by the major American car makers represent a progressive step in this direction, the paradoxical fact is that these vehicles, despite their reduced size and weight, are nevertheless more expensive than vehicles of traditional size.

The higher cost of modern compact cars cannot entirely be imputed to an inflated economy. These compacts, as presently produced, are essentially small-scale versions of larger vehicles and their frames and bodies are assembled in basically the same way, for they have not undergone any fundamental structural changes.

For example, one can reduce the weight of a vehicle by substituting high-strength plastic parts for steel and other metal parts, but this does not necessarily result in a significant saving; for not only are petroleum-derived plastics going up in cost, but since the basic structural design of the vehicle is unchanged, assembly costs remain high. Thus the use of a fiberglass-reinforced plastic shell for the body of a car rather than a conventional metal shell makes possible a lighter body, but not a less expensive one. And since existing assembly procedures are labor intensive, it is now more expensive to produce a modern compact car than it was to manufacture a larger vehicle.

In our above-identified copending application, there is disclosed an all plastic, or composite, or advanced composite, or metal, or honeycomb modular structure whose components, when assembled, define a trussed chassis usable in conjunction with a broad range of different body configurations to create an automotive vehicle of any desired type. This modular structure is composed of two identical cradles which are bridged by a floor tray to create a chassis for supporting all other elements of the vehicle.

The present case expands the principles underlying the invention to encompass sea and air as well as land vehicles; for essentially the same trussed chassis can be used to advantage in all such vehicles.

Relevant to this invention is the White U.S. Pat. No. 2,973,220, in which a plastic car body is formed of molded front and rear sections that are joined together to create the basic structure. Also pertinent is the Porsche U.S. Pat. No. 2,814,524, in which the car body is composed of front, rear and middle sections formed of pressed synthetic sheet material. A plastic chassis frame is disclosed in the patent to Thompson, Jr., U.S. Pat. No. 3,550,948, as well as in the Schröder U.S. Pat. No. 3,331,627. Also relevant are the patent to Leonardis, U.S. Pat. No. 4,254,987 and the French patent to Covini, U.S. Pat. No. 2,471,307.

SUMMARY OF INVENTION

In view of the foregoing, the main object of this invention is to provide a modular structure whose components when assembled define a trussed chassis, the same chassis being usable in conjunction with a broad range of different body configurations to create a land, sea or air vehicle of any desired type.

More particularly, an object of this invention is to provide a modular structure of the above type composed of two identical cradles which are bridged by a floor tray to create a chassis for supporting all other elements of the vehicle, the resultant vehicle being light-weight, inexpensive, and relatively easy to service and repair.

Among the significant advantages of a modular structure in accordance with the invention are ease of manufacture and assembly, multiple body styles on the same chassis as well as the ability to ship the components of the structure in the unassembled state to remote sites. Thus the modular structure, whose components are preferably molded or otherwise fabricated of plastic, or composite, or advanced composite, or metal, or honeycomb material, may be manufactured at a central facility and shipped therefrom to assembly plants dispersed throughout the world.

Briefly stated, these objects are accomplished in a modular structure formed of components which when assembled define the basic chassis of a land, sea, or air vehicle, to which chassis is attachable a body which may be a fuselage or hull in a selected configuration to create the desired vehicle. The structure consists of substantially identical front and rear cradles joined to opposing ends of a floor tray. The use to which the cradles are put depends on the nature of the vehicle, so that in the case of a land vehicle, wheel suspension fixtures are bolted to the cradles to support the wheels depending on the nature of the vehicle. Overlying the floor tray and secured thereto is a safety capsule, the capsule acting as a truss for the chassis and functioning as the cockpit section of a body which, in the case of an automobile, is completed by a front body section secured to the front cradle and a rear body section secured to the rear cradle.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

The Basic Structure

Figure 1:
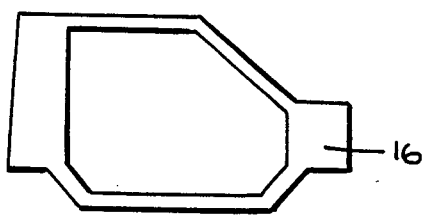
FIG. 1 shows in sketch form the essential components of a trussed modular chassis structure in accordance with the invention.
Figure 2:
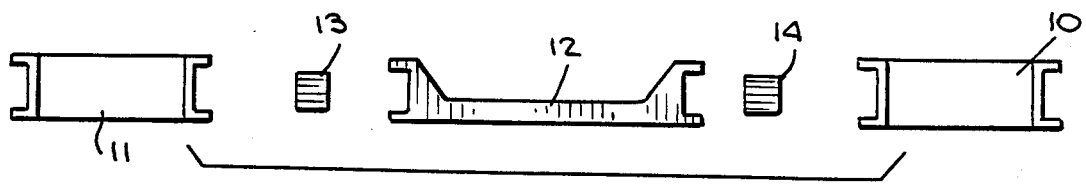
FIG. 2 shows the assembled structure.
Figure 2:
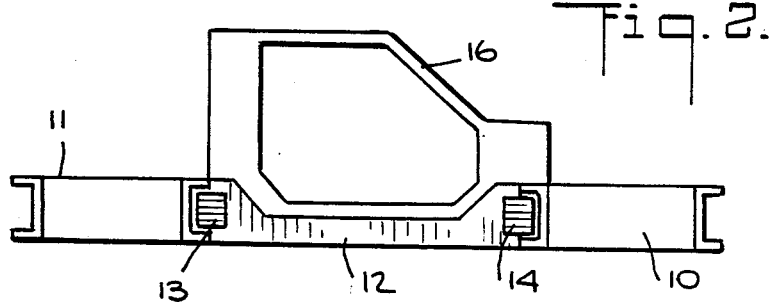

Referring now to FIGS. 1 and 2, a modular stressed chassis in accordance with the invention is constituted by substantially identical front and rear cradles 10 and 11 which are bridged by a floor tray 12 to create an assembly defining the basic structure for a land, sea or air vehicle. The complementary ends of the floor tray and cradles are in a channel beam formation, and are joined together by connector/coupler/bars 13 and 14 which, when the structure is assembled, are socketed within the channel beams in the manner shown in FIG. 2.

Figure 3:
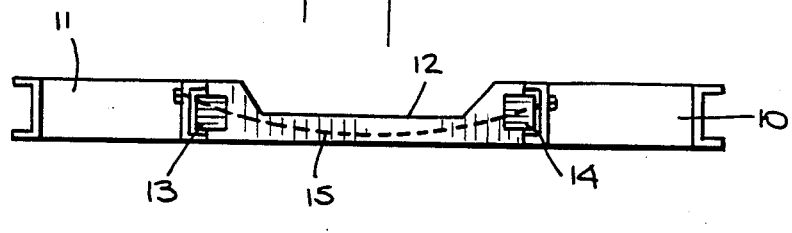
FIG. 3 illustrates the manner in which the chassis is post-tensioned, an alternative fastening system where foam is used to fill the cavity.

The cradles and floor tray are mated at their ends and bolted together to a predetermined torque setting. They can also be linked by a post-tensioning cable 15 bolted at either end, as shown in FIG. 3. In this instance, the cavity of the floor tray may be filled with rigid foam plastic, this foam acting like post-tensioned concrete to encapsulate the rod to conceal the cable. The cavity between the floor tray and cradle can be filled with foam and serve as a safety "crush-up" zone. In addition, an air bag can be used to create "blow-out" zones.

Our above-identified copending application, which is directed to automotive vehicles, discloses the structural details of the components which make up the trussed chassis for such vehicles. In the present case, these components are illustrated in sketch form; for the concern of this invention is with the applicability of essentially the same modular structure to sea and air vehicles, not with the structural details of the components.

In practice, all components of the modular structure may be molded or otherwise fabricated of high strength plastic, composite, advanced composite material such as polycarbonates or high-impact nylon, or they may be made of resin-impregnated fiberglass material. Alternatively, light-weight metals, such as aluminum, honeycomb or laminated materials, may be used to fabricate the cradles and floor tray.

In the assembled chassis in which the front and rear cradles are bolted to an intermediately-placed floor tray, when the chassis is loaded with an engine and other components, bending stresses are transferred through the bolted connections to the floor tray. These bending stresses are resisted by a safety capsule section 16 having suitable doors.

Safety capsule 16, which functions as a sectioned cockpit, is mounted over the floor tray and bolted thereto, the capsule serving as a reinforcing truss for the chassis. The safety capsule completes the structural integrity of the floor tray, for it bolts down into it and thereby bridges stresses around the door openings.

Air Vehicles

Figure 4:
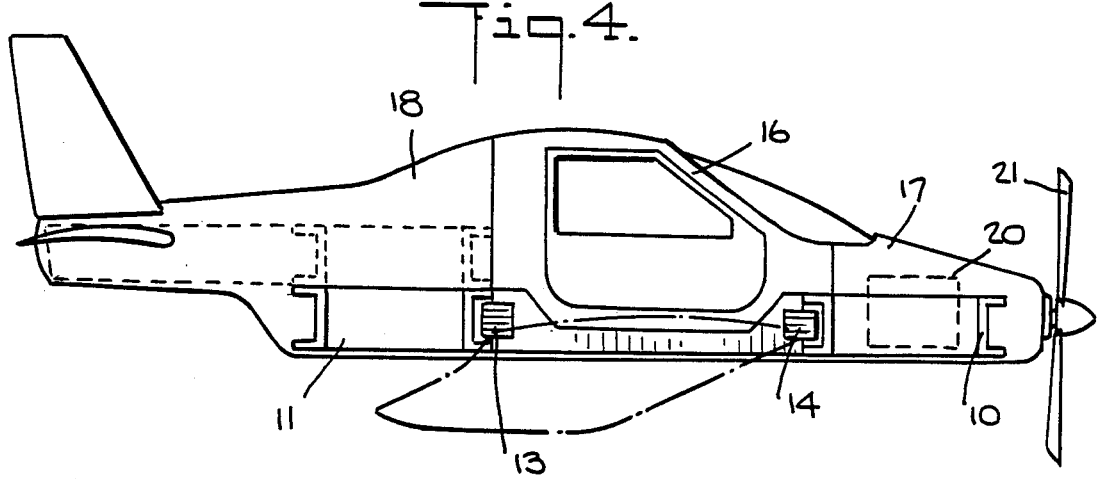
FIG. 4 illustrates an airplane which incorporates the modular structure.

In the single prop airplane illustrated in FIG. 4, it will be seen that the fuselage is completed by joining a nose section 17 to the front end of the capsule 16 which functions as the cockpit of the plane, and by joining a tail section 18 to the rear of the capsule. Wings 19 are attached to the front and rear connectors 14 and 13 and extend outwardly therefrom. An engine 20 for the propeller 21 is mounted in the front section. This high-strength, low-weight stressed chassis structure greatly simplifies the construction and assembly of the plane. In practice, to lengthen the plane, additional cradles may be attached in tandem to front and rear cradles by means of connector rods, or the floor tray and safety capsule may be stretched.

A similar arrangement may be provided for a cruise missile, in which case a jet engine is set up in the tail section on the rear cradle, and guidance controls are installed in the capsule.

Figure 5:
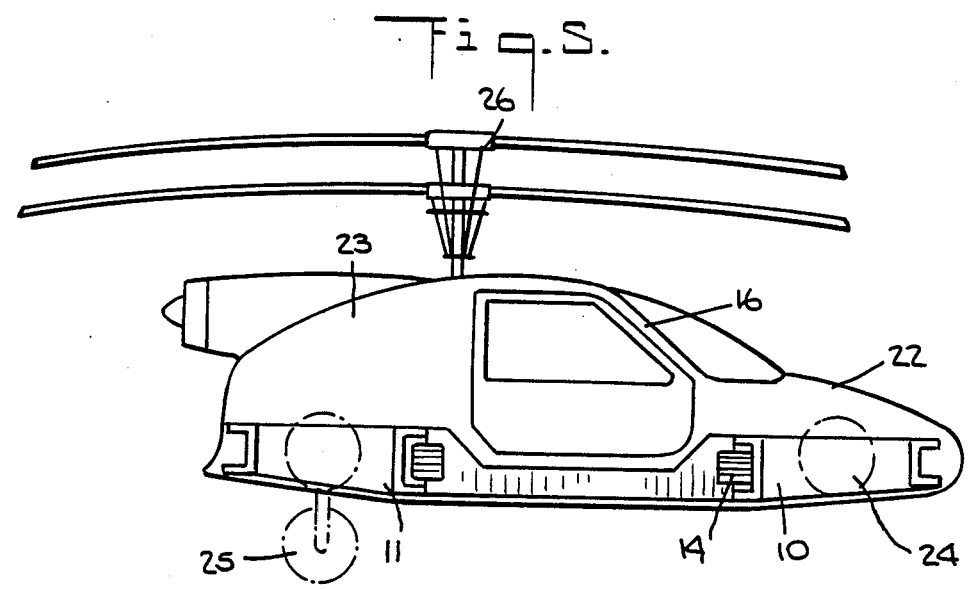
FIG. 5 illustrates a helicopter/carcopter which incorporates the modular structure.

In the twin-rotor helicopter shown in FIG. 5, we again have a nose section 22 attached to the front of capsule 16 and a rear section 23 attached to the rear of the capsule. But in this instance, a retractable landing gear 24 is supported from the front cradle 10 and a like retractable gear 25 to the rear cradle 11. The engine for operating the twin rotor 26 may also be selectively operated to drive the landing gear wheels, so that the helicopter can then function as a land vehicle. The modular stressed chassis is not limited to the particular air vehicles illustrated herein and is applicable to many other forms.

Sea Vehicles

Figure 6:
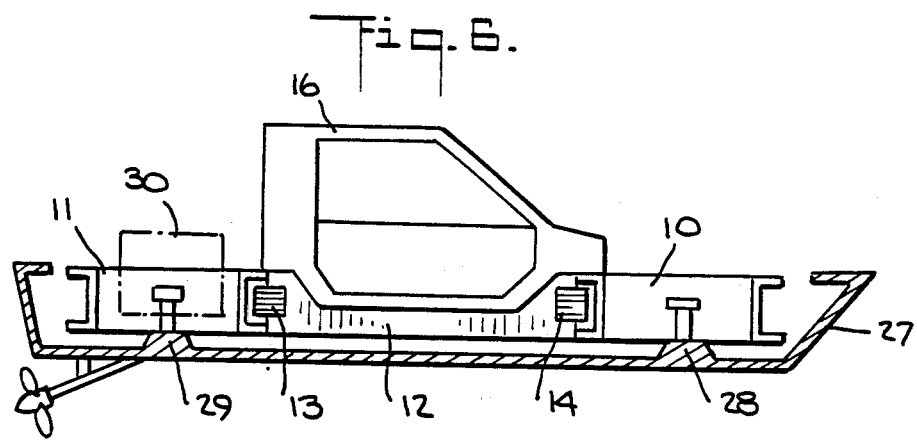
FIG. 6 illustrates a boat which incorporates the modular structure.

The boat shown in FIG. 6 makes use of a stressed chassis in accordance with the invention. The chassis is mounted within the hull 27 of the vessel, front cradle 10 being supported on the hull by a stanchion 28 and rear cradle 11 by a stanchion 29. The engine 30 of the boat, which may be used to drive a screw propeller immersed in the water, is supported on the rear cradle 11 of the modular structure. In the case of a similar air boat which makes use of an exposed wind propeller, the engine therefor may then be mounted at a raised position above the rear cradle 11.

Figure 7:
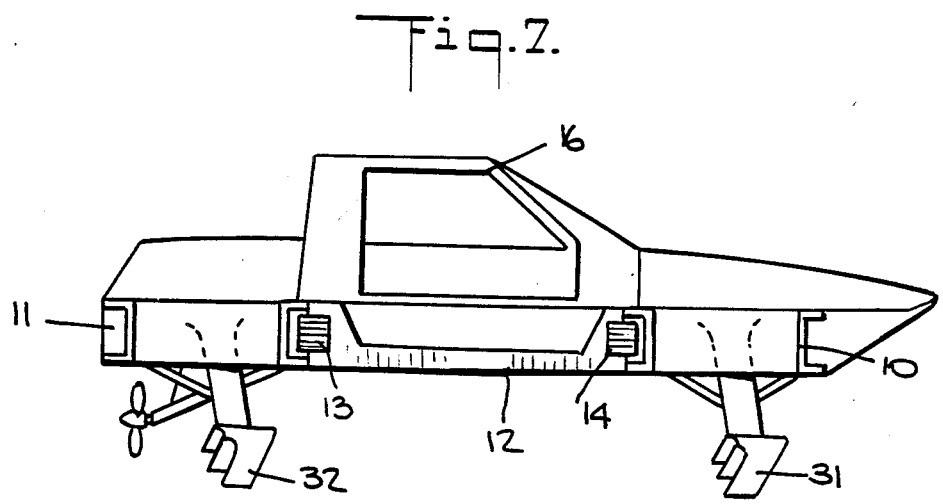
FIG. 7 illustrates a hydrofoil boat which incorporates the modular structure.

In the boat shown in FIG. 7, hydrofoils 31 and 32 are secured to the front and rear cradles 10 and 11, the hydrofoils projecting from the hull into the water to provide a planing action.

Figure 8:
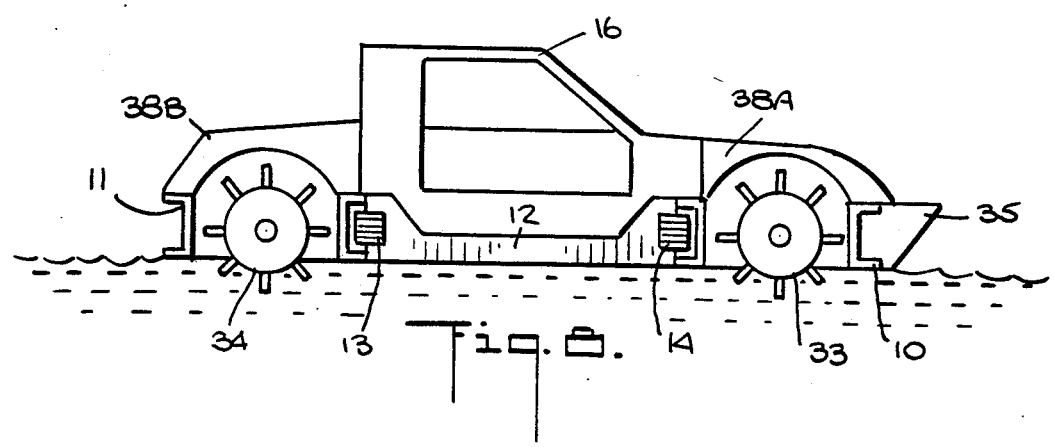
FIG. 8 is a paddle wheel boat which incorporates the modular structure.

In the paddle wheel boat shown in FIG. 8, engine-driven paddle wheels 33 and 34 are suspended from the front and rear cradles. Steering is effected by a differential gear mechanism for coupling the front paddle wheels to the engine so that their relative rate of rotation may be varied in order to cause the boat to veer toward the left or right, as desired. A prow 35 is attached to the front end of the front cradle 10. Steering is also accomplished by steerable paddle wheels.

Land Vehicles

Figure 9:
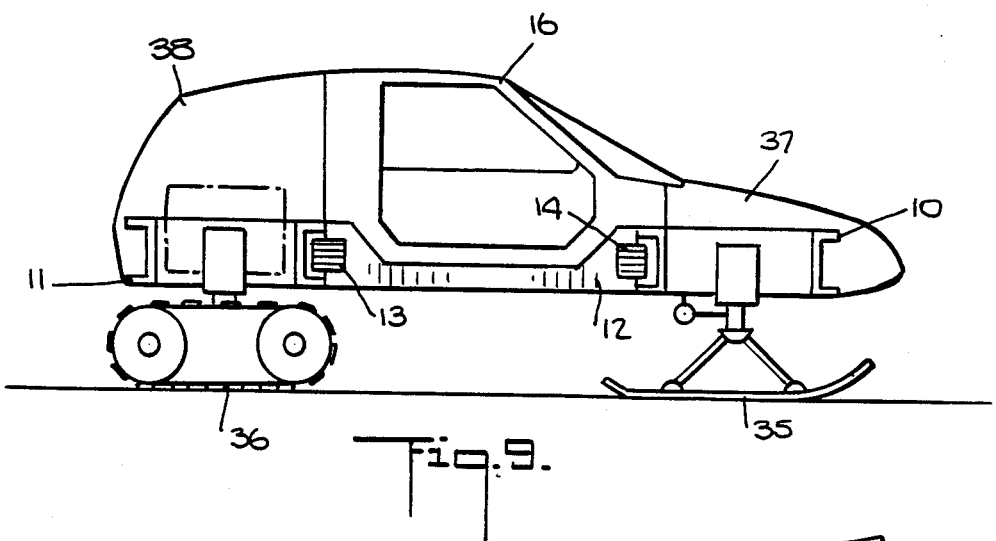
FIG. 9 is a snowmobile which incorporates the modular structure.

In our copending application, the land vehicles disclosed therein were provided with front and rear sets of wheels. As shown in FIG. 9, a snowmobile may be created using a modular stressed chassis in accordance with the invention, with skis 35 suspended below the front cradle 10 and an endless tractor belt 36 mounted below rear cradle 11. The tractor belt is extended between wheels driven by an engine mounted above the rear cradle 11. The vehicle is completed by a front body section 37 attached to the front of capsule 16 and a rear body section 38 attached to the rear thereof.

Figure 10:
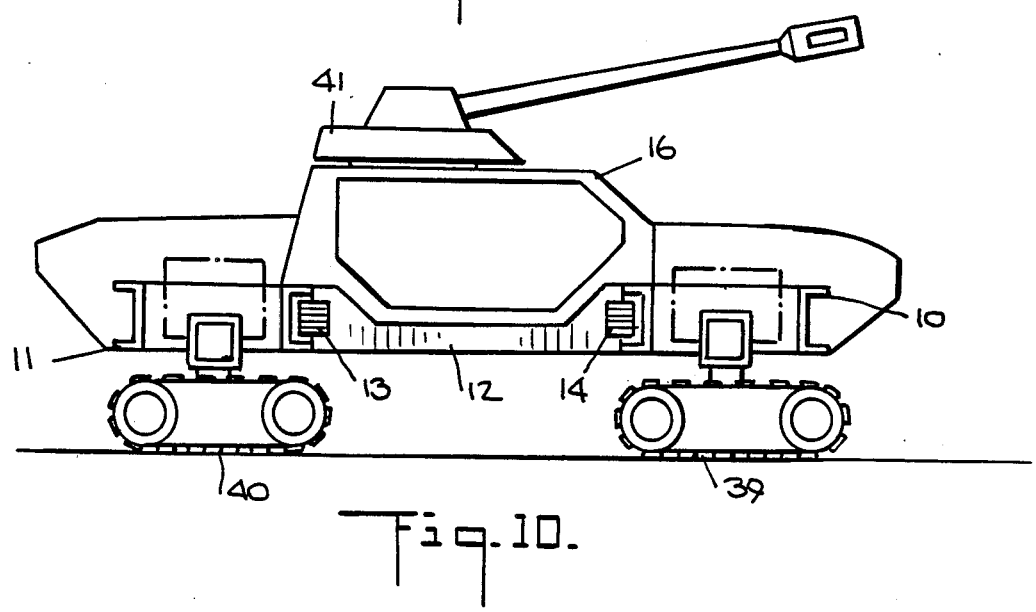
FIG. 10 is a tractor incorporating the modular structure.

In the light armored tank and all-purpose tractor shown in FIG. 10, engine-driven endless tractor belts 39 and 40 are mounted below the front and rear cradles 10 and 11, a gun turret being supported on the roof of capsule 16 which in this instance must be reinforced to support the load thereon.

It will be evident from the foregoing, that the modular trussed chassis can be used to advantage in air and sea as well as in land vehicles, a fuselage or hull appropriate to the vehicle being combined with the chassis to provide a highstrength, light-weight structure.

While there has been shown and described a preferred embodiment of a modular chassis for land, sea and air vehicles in accordance with the invention, it will be appreciated that many changes and modifications may be made therein without, however, departing from the essential spirit thereof.

We claim:

1. A vehicle, such as a land, a sea and an air vehicle, having a modular structure constituted by pre-formed components which when joined together, define the basic trussed chassis of the vehicle, said structure comprising:
    A. a floor tray provided with end beams at either end and a floor extending therebetween;
    B. substantially identical front and rear cradles rigidly joined to the end beams of the tray to create a non-bendable chassis; for supporting an engine mounted on one of said cradles; and
    C. a capsule section secured to said floor tray to act as a truss for the chassis to resist bending stresses imposed on the chassis by said engine and other components mounted on said chassis, a front body section mounted on said front cradle and fixedly secured to the capsule section, and a rear body section mounted on said rear cradle and fixedly secured to said capsule section.

2. A vehicle as set forth in claim 1, wherein said components are fabricated of high-strength plastic material.

3. A vehicle as set forth in claim 1, wherein said components are fabricated of high-strength composite material.

4. A vehicle as set forth in claim 1, wherein said components are fabricated of high-strength advanced composite material.

5. A vehicle as set forth in claim 1, wherein said components are fabricated of high-strength metal material.

6. A vehicle as set forth in claim 1, wherein said components are fabricated of high-strength honeycomb material.

7. A vehicle as set forth in claim 1, wherein said components are fabricated of high-strength laminate material.

8. A vehicle as set forth in claim 1, further including a post-tensioning rod extending through said tray and bolted at either end to the front and rear cradles.

9. A vehicle as set forth in claim 1, in the form of a helicopter in which a nose section is secured to the front of said capsule and a tail section to the rear thereof, and retractable landing gears mounted on said cradles.

10. A vehicle as set forth in claim 1, in the form of an airplane having a nose section coupled to the front of the capsule and a tail section coupled to the rear of the capsule, said front cradle being disposed in said nose section and supporting the engine of the airplane, the airplane having wings extending from the floor tray.

11. A vehicle as set forth in claim 1, in the form of a paddle boat having a front set of driven paddle wheels mounted on the front cradle and a rear set of driven paddle wheels mounted on the rear cradle, said paddle wheels being steerable.

12. A vehicle as set forth in claim 1, in the form of a snowmobile having a set of skis suspended from the front cradle of the chassis and a driven tractor belt mounted on the rear cradle thereof.

13. A vehicle as set forth in claim 1, in the form of a tractor having driven tractor belts mounted below the front and rear cradles of the chassis.

* * * * *